(12) United States Patent
Major

(10) Patent No.: US 9,495,520 B2
(45) Date of Patent: Nov. 15, 2016

(54) SYSTEM AND METHOD FOR PREVENTING OBSERVATION OF PASSWORD ENTRY USING FACE DETECTION

(71) Applicant: 2236008 Ontario Inc., Kanata (CA)

(72) Inventor: Daniel Jonas Major, Kanata (CA)

(73) Assignee: 2236008 Ontario Inc., Waterloo (CA)

( * ) Notice: Subject to any disclaimer, the term of this patent is extended or adjusted under 35 U.S.C. 154(b) by 0 days.

(21) Appl. No.: 14/245,478

(22) Filed: Apr. 4, 2014

(65) Prior Publication Data
US 2015/0286804 A1 Oct. 8, 2015

(51) Int. Cl.
*G06F 21/00* (2013.01)
*G06F 21/32* (2013.01)
*H04W 12/12* (2009.01)
*H04L 29/06* (2006.01)
*H04W 12/06* (2009.01)

(52) U.S. Cl.
CPC ............... *G06F 21/00* (2013.01); *G06F 21/32* (2013.01); *H04L 63/0861* (2013.01); *H04W 12/12* (2013.01); *H04L 63/083* (2013.01); *H04L 63/1475* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 7,991,388 B1 * | 8/2011 | Becker | G06Q 20/32 455/410 |
| 8,321,684 B2 * | 11/2012 | Mumm | G10L 17/22 713/186 |
| 8,600,120 B2 | 12/2013 | Gonion et al. | |
| 2005/0104848 A1 * | 5/2005 | Yamaguchi | G06F 1/1626 345/156 |
| 2005/0185063 A1 * | 8/2005 | Ikehata | H04N 5/232 348/222.1 |
| 2007/0121878 A1 * | 5/2007 | Shaffer | H04M 3/4286 379/215.01 |
| 2007/0128899 A1 * | 6/2007 | Mayer | G06F 9/4406 439/152 |
| 2007/0150827 A1 | 6/2007 | Singh et al. | |

(Continued)

FOREIGN PATENT DOCUMENTS

| | | | |
|---|---|---|---|
| JP | 2006039841 | * 7/2004 | H04L 9/32 |
| JP | 2006039841 | 2/2006 | |

OTHER PUBLICATIONS

How to set up Face Unlock on your Android phone; Gary Mazo; Jul. 24, 2012; http://www.androidcentral.com/how-set-face-unlock-your-htc-one-x-or-evo-4g-lte; pp. 1-8.

(Continued)

*Primary Examiner* — Dede Zecher
*Assistant Examiner* — Richard McCoy
(74) *Attorney, Agent, or Firm* — Ridout and Maybee LLP

(57) ABSTRACT

A method of preventing observation of password entry on an electronic device is provided. The electronic device has a processor coupled to a camera, a display, and a memory. The method comprises activating the camera to acquire an image when the electronic device is in a password entry mode; detecting one or more faces present in the image; and presenting a warning when more than one face is present in the image.

15 Claims, 4 Drawing Sheets

(56) References Cited

U.S. PATENT DOCUMENTS

| | | | | |
|---|---|---|---|---|
| 2008/0088475 | A1* | 4/2008 | Martin | G01D 4/004 340/870.02 |
| 2008/0238666 | A1* | 10/2008 | Loncar | G06F 19/3456 340/540 |
| 2010/0225443 | A1* | 9/2010 | Bayram | G06F 21/316 340/5.83 |
| 2012/0074770 | A1* | 3/2012 | Lee | B60T 8/172 303/20 |
| 2012/0118947 | A1* | 5/2012 | Lyons | G07F 17/3241 235/375 |
| 2012/0176517 | A1* | 7/2012 | Lee | H04N 5/23219 348/240.99 |
| 2012/0235790 | A1 | 9/2012 | Zhao et al. | |
| 2012/0254737 | A1* | 10/2012 | Levien | G06F 3/0487 715/249 |
| 2013/0006848 | A1* | 1/2013 | Kuttuva | G06Q 20/3276 705/39 |
| 2013/0066986 | A1* | 3/2013 | Dicosola | G06Q 10/10 709/206 |
| 2013/0254874 | A1* | 9/2013 | Xu | G06F 21/32 726/17 |
| 2014/0029810 | A1 | 1/2014 | Barr et al. | |
| 2014/0192217 | A1* | 7/2014 | Kim | H04N 5/23293 348/222.1 |
| 2014/0310804 | A1* | 10/2014 | Apostolos | H04L 63/0861 726/19 |
| 2015/0135298 | A1* | 5/2015 | Robison | G06F 21/31 726/10 |

OTHER PUBLICATIONS

Extended European Search Report; EP 15158082.6; Sep. 9, 2015.
Tashiro Toru, English Translation of JP2006039841; Processing device, processing to prevent prying eyes face detection system, automated teller, processing method and program, Feb. 2, 2006.

* cited by examiner

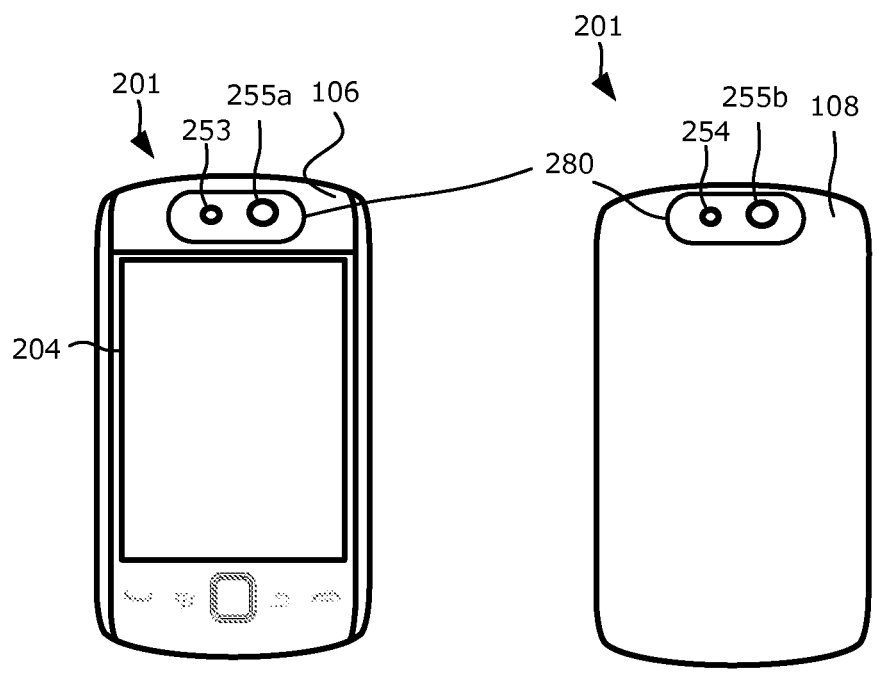
FIG. 1  FIG. 2

SYSTEM AND METHOD FOR PREVENTING OBSERVATION OF PASSWORD ENTRY USING FACE DETECTION

FIELD

The present application is generally related to security on electronic devices, and more particularly to preventing unauthorized password entry using face detection on mobile communication devices.

BACKGROUND

Communication devices such as mobile communication devices may be equipped with cameras. Cameras can be used to bolster security of the mobile communication device.

BRIEF DESCRIPTION OF DRAWINGS

In order that the subject matter may be readily understood, embodiments are illustrated by way of examples in the accompanying drawings, in which:

FIG. 1 is a front elevation view of an example electronic device in accordance with example aspects of the present disclosure;

FIG. 2 is a rear elevation view of the example electronic device of FIG. 1 in accordance with example aspects of the present disclosure;

DETAILED DESCRIPTION

Figure 3:
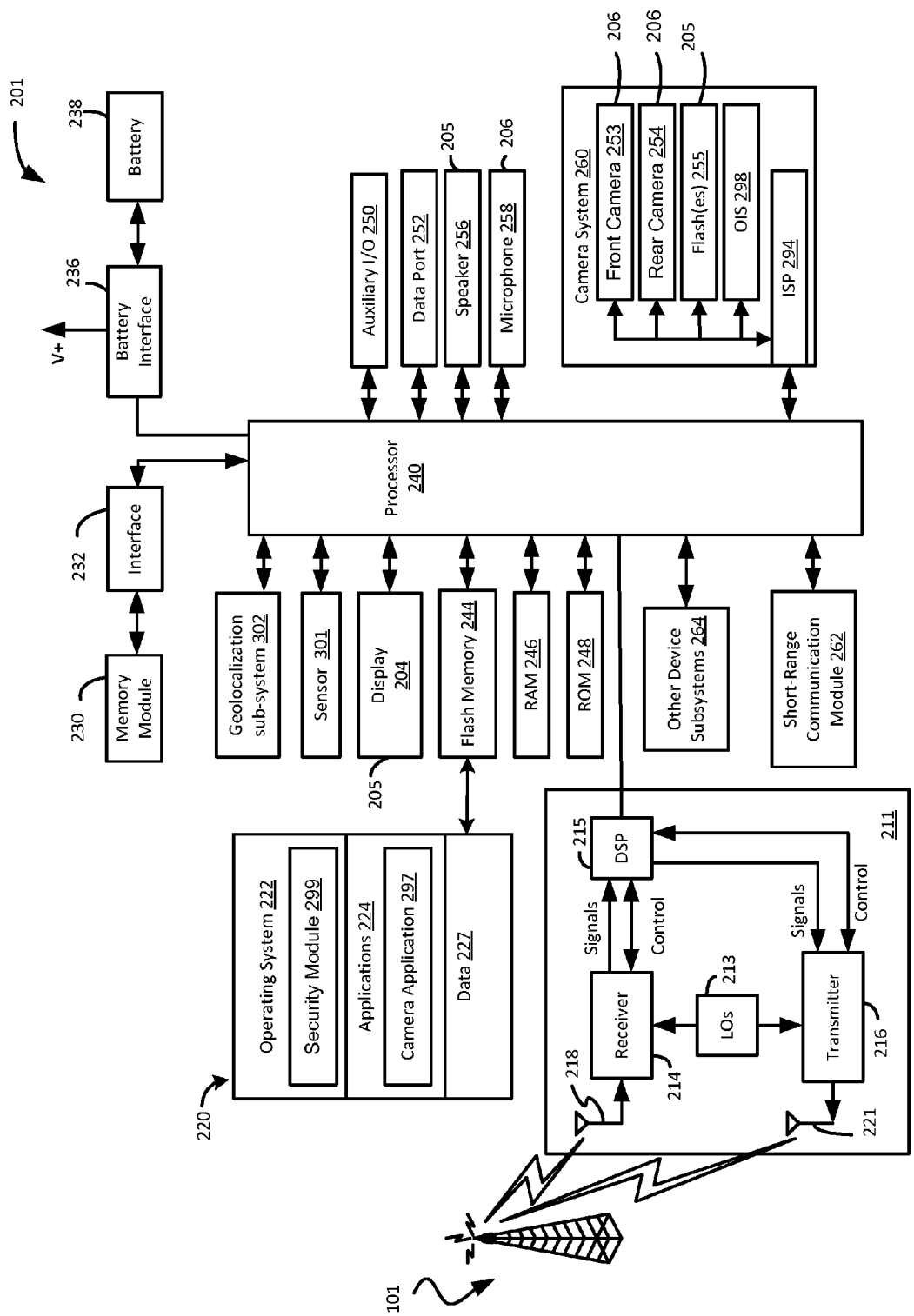
FIG. 3 is a block diagram illustrating components of the example electronic device of FIG. 1 in accordance with example aspects of the present disclosure.

In accordance with an aspect of the present description, described is an electronic device comprising a processor, a display coupled to the processor, a memory coupled to the processor, a camera coupled to the processor, and a security module saved in the memory. The security module configures the processor to activate the camera to acquire an image when the electronic device is in a password entry mode, detect one or more faces present in the image, and present a warning when more than one face is present in the image.

In accordance with another aspect of the present description, described is a method of preventing observation of password entry on an electronic device having a processor coupled to a camera, a display, and a memory. The method comprises activating the camera to acquire an image when the electronic device is in a password entry mode, detecting one or more faces present in the image, and presenting a warning when more than one face is present in the image.

In accordance with another aspect of the present description, described is a non-transitory computer-readable medium storing program instructions that when executed by a processor, cause the processor to perform a method for preventing observation of password entry on an electronic device. The method comprises activating a camera to acquire an image when the electronic device is in a password entry mode, detecting one or more faces present in the image, and presenting a warning when more than one face is present in the image.

A common problem in the world of security for mobile communication devices is preventing an individual for obtaining a user's password by watching the user input the password into the device. This problem is commonly referred to as "shoulder surfing" when a third party stands behind a user for the purpose of observing the user's input into the mobile communication device.

To address one or more of the above-noted issues a camera of the mobile communication device, such as a front facing camera, may be activated when the password entry mode of the device is active. The camera system of the device and/or the device processor may have the ability to detect faces in images acquired by the camera. If more than one face is detected in images acquired by the camera when the password entry mode is active, the device may issue an alert or warning to the user of the device, warning that someone may be trying to observe the user enter his or her password.

Example Communication Device

Referring first to FIG. 1, a front view of an example electronic device 201 is illustrated. The electronic device can be a mobile phone, portable computer, smartphone, tablet computer, personal digital assistant, a wearable computer such as a watch, a television, a digital camera or a computer system, for example. The electronic device may be of a form apart from those specifically listed above.

FIG. 1 illustrates a front view of the electronic device 201. The front view of the electronic device 201 illustrates a front face 106 of the electronic device 201. The front face 106 of the electronic device 201 is a side of the electronic device 201 which includes a main display 204 of the electronic device 201. The front face 106 of the electronic device 201 is a side of the electronic device 201 which is configured to be viewed by a user. The front face 106 also includes a front facing camera 253, and optionally a flash 255a.

FIG. 2 illustrates a rear view of the electronic device 201. The rear view of the electronic device 201 illustrates a rear face 108 of the electronic device 201. The rear face 108 is a side of the electronic device 201 that does not include a main display 204 of the electronic device 201. In the example illustrated, the rear face 108 is a side of the electronic device 201 that is opposite the front face 106 (FIG. 1) of the electronic device 201. That is, the rear face 108 may be substantially parallel to the front face 106 of the electronic device 201. The rear face 108 also includes a rear facing camera 254, and optionally a flash 255b.

The electronic device 201 includes one or more cameras 253, 254. The cameras 253, 254 are configured to generate camera media, such as images in the form of still photographs, motion video or another type of camera data. The camera media may be captured in the form of an electronic signal which is produced by an image sensor associated with the camera 253, 254. Components other than the image sensor may be associated with the camera 253, 254, although such other components may not be shown in the Figures. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera media or camera data) from which information referred to as image context may be computed.

In the example illustrated, the electronic device 201 includes a rear facing camera 254. A rear facing camera is a camera 254 that is located to obtain images of a subject near a rear face 108 of the electronic device 201. That is, the rear facing camera may be located on or near a rear face 108 of the electronic device 201.

The electronic device 201 also includes a front facing camera 253 instead of or in addition to the rear facing camera 254. The front facing camera 253 is a camera which is located to obtain images of a subject near the front face 106 of the electronic device 201. That is, the front facing camera may be generally located at or near a front face 106 of the electronic device 201. The front facing camera may be located anywhere on the front surface of the electronic device; for example, the front facing camera may be located above or below the display 204. In at least some examples, the front facing camera 253 may be provided in a central location relative to the display 204 to facilitate image acquisition of a face. In at least some embodiments, the front facing camera 253 may be used, for example, to allow a user of the electronic device 201 to engage in a video-based chat with a user of another electronic device 201. In at least some embodiments, the front facing camera is mounted internally within a housing of the electronic device 201 beneath a region of the front face 106 which transmits light. For example, the front facing camera 253 may be mounted beneath a clear portion of the housing which allows light to be transmitted to the internally mounted camera.

In at least some examples, the electronic device 201 may include both the front facing camera 253 and also the rear facing camera 254. The rear facing camera 254 may obtain images which are not within the field of view of the front facing camera 253. The fields of view of the front facing and rear facing cameras may generally be in opposing directions.

The electronic device 201 includes one or more flashes 255a and 255b, collectively referred to as flash 255. The flash 255 may, in at least some examples, be a light emitting diode (LED) flash. The flash 255 emits electromagnetic radiation. More particularly, the flash 255 may be used to produce a brief bright light which may facilitate picture-taking in low light conditions. That is, the flash 255 may emit light while an image is captured using the cameras 253, 254. In the example illustrated, the flash 255b is located to emit light at the rear face 108 of the electronic device 201. That is, the flash 255b is a rear-facing flash. The electronic device 201 may include the front-facing flash 255a instead of or in addition to the rear facing flash 255b to emit light at the front face 106 of the electronic device 201. The electronic device 201 may have additional camera hardware which may complement the cameras 253, 254.

Still referring to FIG. 2, transparent covers 280 cover the image sensors of the cameras 253, 254 and the flash 255. The transparent cover 280 allows light to pass through (e.g. from the flash 255 to the exterior of the housing or from the exterior of the housing to the image sensor) and prevents debris or dirt from entering into the housing. Dirt or debris that could otherwise enter into the housing could potentially damage the components of the camera 253, 254 and flash 255. In the example illustrated in FIG. 2 transparent covers 280 are secured to the housing. For example, the transparent covers 280 may be secured to the housing using an adhesive or using snaps or similar attachment mechanism in such a manner so as to be flush with the housing. The transparent covers 280 can be transparent and made out of glass or plastic or another suitable transparent or translucent material. For example, the cover 280 can be made out of stained or partially stained glass.

Referring now to FIG. 3, a block diagram of an example electronic device 201 is illustrated. The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with components or device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, 254, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, one or more speakers 256, or other output interfaces), a short range communication module 262, and other device subsystems generally designated as 264. Some of the components or subsystems shown in FIG. 3 perform communication-related functions, whereas other components or subsystems may provide "resident" or on-device functions.

The electronic device 201 may include a touchscreen display. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some examples, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various examples, the data 227 may include service data having information used by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data. The data 227 may, in at least some examples, include metadata which may store information about the images. In some embodiments the metadata and the images may be stored together. That is, a single file may include both an image and also metadata regarding that image. For example, in at least some embodiments, the image may be formatted and stored as a JPEG image.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some examples, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing. Further, data may be transmitted to and from the electronic device 201 using a WiFi network or using near field communication technologies.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 can also include one or more sensors 301 such as temperature sensor, rotation sensors (for example, a gyroscope), translation sensors (for example accelerometers), position sensors (for example, magnetometers), and sensor sub-systems such as a geolocalization sub-system 302, which can be based on a global positional signal.

In the example illustrated, the cameras 253, 254 are included in a camera system 260 along with a flash 255, an optical image stabilizer (OIS) 298 and an image signal processor (ISP) 294. The optical image stabilizer (OIS) 298 may be integrated with the cameras 253, 254 or it may be a separate component. For example, the OIS 298 may be considered as a functional part of the camera system 260. Similarly, the ISP 294 may be embedded in the processor 240 and it may also be considered as a functional part of the camera system 260. In at least some examples, the cameras 253, 254 may be associated with a dedicated image signal processor 294 which may provide at least some camera-related functions, with the image signal processor 294 being either embedded in the cameras 253, 254 or a separate device. For example, in at least some embodiments, the image signal processor 294 may be configured to provide auto-focusing functions. Functions or features which are described below with reference to the camera application 297 may, in at least some embodiments, be provided, in whole or in part, by the image signal processor 294.

The camera system 260 associated with the electronic device 201 also includes a flash 255. As noted above, the flash 255 is used to illuminate a subject while the cameras 253, 254 capture an image of the subject. The flash 255 may, for example, be used in low light conditions. In the example illustrated, the flash 255 is coupled with the main processor 240 of the electronic device 201. The flash 255 may be coupled to the image signal processor 294, which may be used to trigger the flash 255. The image signal processor 294 may, in at least some embodiments, control the flash 255. In at least some such embodiments, applications associated with the main processor 240 may be permitted to trigger the flash 255 by providing an instruction to the image signal processor 294 to instruct the image signal processor 294 to trigger the flash 255. In one or more embodiments, the image signal processor 294 may be coupled to the processor 240.

The optical image stabilizer 298 can be coupled to the camera 253 or the image signal processor 294 or both and operates to stabilize the camera 253 during an image capture. The optical image stabilizer 298 may receive instructions from the image signal processor 294. Similarly, the optical image stabilizer 298 may be coupled to the processor 240 and may receive instructions from the processor 240. The image signal processor 294 may obtain data from the optical image stabilizer 298 relating to its movement and operation. In one or more embodiments, the camera system 260 may have a separate memory (not shown) on which the image signal processor 294 can store data and retrieve instructions. Such instructions may, for example, have been stored in the memory by the processor 240, which may in some embodiments also be coupled to the separate memory in the camera system 260.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

The electronic device may have a security module 299, which may be implemented as part of the operating system 222. Alternatively, the security module 299 may be installed as one of the applications 224. The security module 299 may implement many or all of the security features of the electronic device 201, such as password entry, voice detection, face detection and/or face recognition, data encryption, etc. The security module 299 may operate in communication with other applications or module, such as the camera application 297, for receiving data from one or both of the cameras 253, 254.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 3, the software modules 220 may include the operating system software 222 and one or more additional applications 224 or modules such as, for example, the camera application 297. The processor 240 may also operate to process data 227 stored in memory associated with the electronic device 201.

In the example of FIG. 3, the camera application 297 is illustrated as being implemented as a stand-alone application 224. However, in other example examples, the camera application 297 could be provided by another application or module such as, for example, the operating system software 222 or, in some examples, the security module 299. Further, while the camera application 297 is illustrated with a single block, the functions or features provided by the camera application 297 could, in at least some embodiments, be divided up and implemented by a plurality of applications and/or modules. In one or more embodiments, the camera application 297 can be implemented by the ISP 294.

The camera application 297 may, for example, be configured to provide a viewfinder on the display 204 by displaying, in real time or near real time, an image defined in the electronic signals received from the cameras 253, 254. The camera application 297 may also be configured to capture an image or video by storing an image or video defined by the electronic signals received from the cameras 253, 254 and processed by the image signal processor 294. For example, the camera application 297 may be configured to store an image or video to memory of the electronic device 201.

The camera application 297 may also be configured to control options or preferences associated with the cameras 253, 254. For example, the camera application 297 may be configured to control a camera lens aperture and/or a shutter speed. The control of such features may, in at least some embodiments, be automatically performed by the image signal processor 294 associated with the cameras 253, 254.

In at least some examples, the camera application 297 may be configured to focus the cameras 253, 254 on a subject. For example, the camera application 297 may be configured to request the image signal processor 294 to control an actuator of the cameras 253, 254 to move a lens (which is comprised of one or more lens elements) in the cameras 253, 254 relative to an image sensor in the cameras 253, 254. For example, when capturing images of subjects which are very close to the cameras 253, 254 (e.g. subject at macro position, such as a person entering a password), the image signal processor 294 may control the actuator to cause the actuator to move the lens away from the image sensor.

In at least some examples, the image signal processor 294 may provide for auto-focusing capabilities. For example, the image signal processor 294 may analyze received electronic signals to determine whether the images captured by the camera are in focus. That is, the image signal processor 294 may determine whether the images defined by electronic signals received from the cameras 253, 254 are focused properly on the subject of such images. The image signal processor 294 may, for example, make this determination based on the sharpness of such images. If the image signal processor 294 determines that the images are not in focus, then the camera application 297 may cause the image signal processor 294 to adjust the actuator which controls the lens to focus the image.

In at least some examples, the camera application 297 may be configured to control a flash associated with the cameras 253, 254 and/or to control a zoom associated with the cameras 253, 254. In at least some embodiments, the camera application 297 is configured to provide digital zoom features. The camera application 297 may provide digital zoom features by cropping an image down to a centered area with the same aspect ratio as the original. In at least some embodiments, the camera application 297 may interpolate within the cropped image to bring the cropped image back up to the pixel dimensions of the original.

The software modules 220 or parts thereof may be temporarily loaded into volatile memory such as RAM 246. The RAM 246 is used for storing runtime data variables and other types of data or information. Although specific functions are described for various types of memory, this is merely one example, and a different assignment of functions to types of memory.

Figure 4:
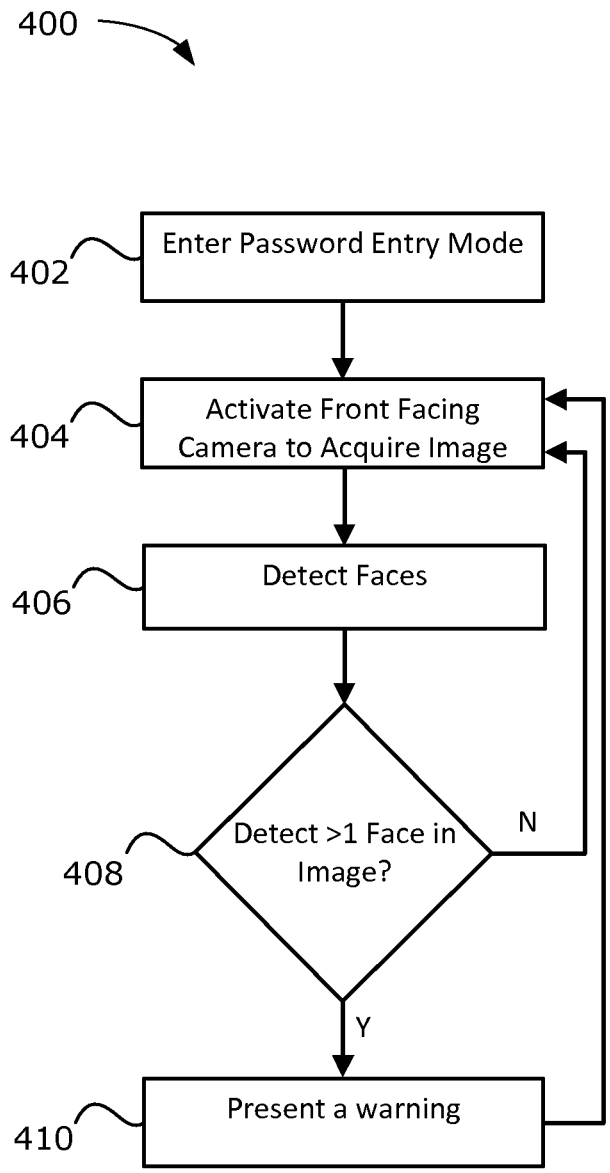
FIG. 4 is a flow-chart illustrating an example of a method of preventing observation of password entry on the electronic device of FIG. 1.

Example Methods of Preventing Observation of Password Entry on an Electronic Device Referring to FIG. 4, an exemplary method 400 of preventing observation of password entry on an electronic device will now be described. In one example, the method 400 can be implemented on an electronic device 201 having a processor 240, a display 204 coupled to the processor 240, a memory (244 and/or 246 and/or 248) coupled to the processor 240, and a camera (e.g., camera system 260 having the cameras 253 and/or 254) coupled to the processor 240.

At 402, a password entry mode is initiated on the electronic device 201. The password entry mode may be initiated in response to a user of the electronic device 201 attempting to use the electronic device 201 when the electronic device 201 is in a locked mode. For example, when the electronic device 201 is in a locked mode requiring password entry for further use, the user may attempt to provide an input to the electronic device 201, such as by touching the display 204 that provides an input 205 to the processor 240, by pushing a button on the electronic device 201 that provides an input 205 to the processor 240, or even by picking up the electronic device 204 that may provide an input to the processor 240, such as from the sensor 301. When the user attempts to provide such input to the electronic device 201 when in a locked mode, the security module 299 may require password entry from the user before providing some or any of the functions of the electronic device 201. In one example, the required password entry may be provided on the display 204 in the form of a prompt or password entry field where the user may touch keys of a virtual keyboard displayed on the display 204 in order to enter the password needed to unlock the device.

When the password entry mode described above is active (e.g., before the user has entered the entire correct password and pressed the enter key, resulting in verification of the password and termination of the locked mode of the electronic device 201), a camera may be activated at 404. The camera may be activated to acquire an image when the electronic device 201 is in the password entry mode. In one example, the camera may be a front facing camera such as the front facing camera 253, since the user entering the password will typically be located in front of the front face 106 of the wireless device 201. While the front facing camera 253 is used as an example, any camera such as the camera 254 or both of the cameras 253 and 254 may be used to meet the design criteria of a particular application. At 404, data representing an image is acquired by the image sensor of the camera 253 and the data is provided to the ISP 294 and/or to the processor 240.

At 406, the data representing the image is processed to detect faces (e.g., by either the ISP 294 or the processor 240). Face detection may be performed according to any known or yet to be designed face detection methodology. Exemplary face detection methodologies are already employed on existing digital cameras and portable electronic devices, as illustrated when squares, crosshairs, or other indicia are shown on camera viewfinders indicating the presence of one or more faces in an image to be acquired. At 406, any faces present in the data representing the image may be detected and the resulting number of detected faces counted with the result assigned to a variable (e.g., X faces are present in the current image).

At 408, a query is executed to see if X>1. That is, whether any faces are detected in the image. If X=<1, no faces are detected in the image and the method 400 returns to 404, where the sequence of blocks 404, 406, 408 is executed in a loop fashion until either the method 400 terminates when the password entry mode terminates or more than one face is detected, in which case the method 400 proceeds to 410. In other embodiments, the security module 299 causes a warning to be displayed on the display 204 indicating no faces are detected in the image and/or disable the password entry mode when no faces are detected in the image.

If, at 408, X>1, the method 400 proceeds to 410, where a warning is presented if more than one face is present in the image. The warning may include a visual notification displayed on the display 204. The visual notification may include a colour indication displayed on the display 204 adjacent to a password entry area displayed on the display 204 and/or a pop-up window having a message displayed on the display 204. In one example, the colour indication could be in the form of a coloured border placed around the password entry field or password entry window present on the display 204. In another example, the colour indication displayed on the display 204 could be a background colour change applied to the display 204 such that most of or the entire colour of the display 204 changes. In another example, a pop-up window may be displayed on the display 204 with a message telling the user that more than one person or face has been detected. In another example, the message may simply instruct the user to ensure that no one is observing the device password being entered. While a number of examples of visual notifications have been provided, any visual notification, whether discrete or overt, could be used to alert the user that more than one person or face has been detected by the front facing camera 253, according to the design criteria of a particular application.

In another example, the electronic device 201 has a speaker such as the speaker 256 coupled to the processor 240 and the warning may include an audio notification played through the speaker. In one example, the user may have headphones connected to the electronic device 201 and the device may play a simple message to the user of the electronic device 201. The message may read content to the user that is similar to the message contained in the pop-up windows, discussed above, or the message may be any suitable tone, noise, pre-recorded message, etc.

In another example, the electronic device 201 has a vibrator (e.g., other device subsystems 264 may include a vibrator) coupled to the processor 240 and the warning may include a vibratory notification presented using the vibrator. For example, if the user is holding the electronic device 201 in a password entry mode and the front facing camera 253 detects more than one person or face in an image, the electronic device 201 may vibrate briefly to alert the user that the entry of the password could be observed by another person.

Once a warning is presented on the display 204 at block 410, the method 400 then returns to the block 404. Optionally, at 410, password entry mode of the electronic device 201 may be disabled when more than one face is detected in the image. For example, the warning may be displayed at 410 and any password entered by a user may be rejected as long as more than one face is detected in the image. In another example, the user may be prevented from entering any further password characters as long as more than one face is detected in the image.

Figure 5:
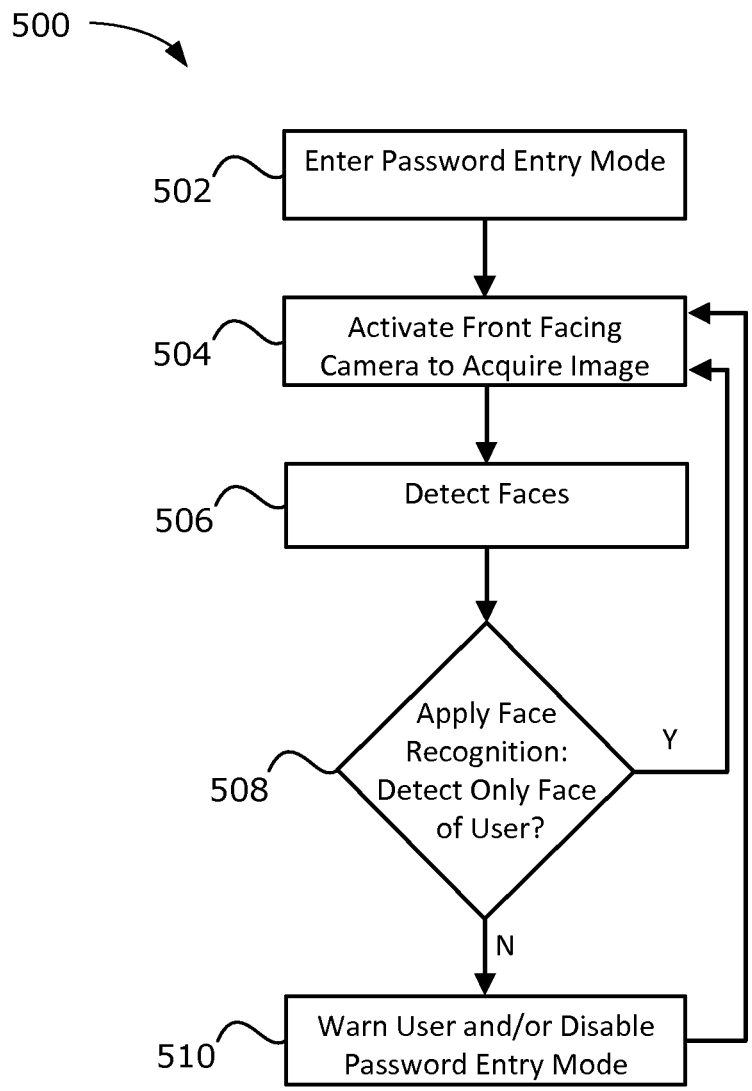
FIG. 5 is a flow-chart illustrating another example of a method of preventing observation of password entry on the electronic device FIG. 1.

Referring now to FIG. 5, another exemplary method 500 of preventing observation of password entry on an electronic device will now be described. Blocks 502, 504, and 506 of method 500 are similar to blocks 402, 404, and 406 of method 400, respectively, and therefore the description of blocks 502, 504, and 506 is kept brief.

In one example, the method 500 can be implemented on an electronic device 201 having a processor 240, a display 204 coupled to the processor 240, a memory (244 and/or 246 and/or 248) coupled to the processor 240, and a camera (e.g., camera system 260 having the cameras 253 and/or 254) coupled to the processor 240.

At 502, a password entry mode is initiated on the electronic device 201, as described above with reference to block 402.

When the password entry mode described above is active (e.g., before the user has entered the entire correct password and pressed the enter key, resulting in verification of the password and termination of the locked mode of the electronic device 201), a camera may be activated at 504, as described above with reference to block 404.

At 506, the data presenting the image is processed to detect faces (e.g., by either the ISP 294 or the processor 240), as described above with reference to block 406. At 506, any faces present in the data representing the image may be detected and the resulting number counted with the result assigned to a variable (e.g., Y faces are present in the current image).

At 508, a query is executed to see if $Y>1$. Block 508 may also apply face recognition. Under control of the security module 299, the electronic device 201 may have a previously stored sample of the owner's face in memory (e.g., as data 227 stored in the memory 244). Whenever a face is detected at the block 506, the block 508 may also attempt facial recognition to see if the detected face is that of the owner of the electronic device 201. If $Y<=1$ and the detected face is that of the owner, the method 500 returns to 504, where the sequence of blocks 504, 506, 508 is executed in a loop fashion until either the method 500 terminates when the password entry mode terminates or more than one face is detected, in which case the method 500 proceeds to 510.

If, at 508, $Y>1$ and/or $Y<=1$ and any face is detected that is not that of the owner of the wireless device 201, the method 500 proceeds to 510, where a warning is presented if more than one face is present in the image or if any face that is not that of the owner of the wireless device 201 is detected in the image.

The warning may include a visual notification displayed on the display 204. The visual notification may include a colour indication displayed on the display 204 adjacent to a password entry area displayed on the display 204 and/or a pop-up window having a message displayed on the display 204. In one example, the colour indication could be in the form of a coloured border placed around the password entry field or password entry window present on the display 204. In another example, the colour indication displayed on the display 204 could be a background colour change applied to the display 204 such that most of or the entire colour of the display 204 changes. In another example, a pop-up window may be displayed on the display 204 with a message telling the user that more than one person or face has been detected, or telling the user that he is not authorized to enter a password into the wireless device 201 if the user is not the owner of the wireless device 201. In another example, the message may simply instruct the user to ensure that no one is observing the device password being entered. While a number of examples of visual notifications have been provided, any visual notification, whether discrete or overt, could be used to alert the user that more than one person or face has been detected by the front facing camera 253, according to the design criteria of a particular application.

In another example, an audio notification or vibratory notification may be presented, as previously described.

Once a warning is presented on the display 204, the method 500 then returns to the block 504. Optionally, at 510, password entry mode of the electronic device 201 may be disabled when more than one face is detected in the image or when any face not belonging to the owner of the electronic device 201 is present in the image. For example, the warning may be displayed at 510 and any password entered by a user may be rejected as long as more than one face is detected in the image or when any face not belonging to the owner of the electronic device 201 is present in the image. In another example, the user may be prevented from entering any further password characters as long as more than one face is detected in the image or when any face not belonging to the owner of the electronic device 201 is present in the image.

While the present application mentions cameras for determining whether more than one face can be detected in front of the electronic device, any suitable sensor of the electronic device may be used to gather data to determine whether more than one person is likely in a position to observe the display of the electronic device.

While the present application is primarily described in terms of methods, a person of ordinary skill in the art will understand that the present application is also directed to various apparatus' such as an electronic device including a mobile communications device or camera. The electronic device includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a non-transitory compute readable storage medium may include computer executable instructions tangibly embodying code for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

One or more embodiments have been described by way of example. It will be apparent to persons skilled in the art that a number of variations and modifications can be made without departing from the scope of what is defined in the claims.

What is claimed is the following:

1. An electronic device comprising:
    a processor;
    a display coupled to the processor;
    a memory coupled to the processor;
    a front facing camera coupled to the processor; and
    a security module saved in the memory, the security module for configuring the processor to:
        activate the front facing camera to acquire an image when the electronic device is in a password entry mode to unlock the electronic device;
        process the image to detect any faces in the image;
        when no faces are detected in the image, disable the password entry mode;
        when one or more faces are detected in the image,
            process the image to determine whether each face in the image is the face of an authorized user of the electronic device;
            when any face other than a face of an authorized user of the electronic device is detected in the image,
                present on the display a visual notification including a warning indicating observation of the display of the wireless device; and
                disable the password entry mode.

2. The electronic device according to claim 1, wherein the visual notification includes a color indication displayed on the display adjacent to a password entry area displayed on the display.

3. The electronic device according to claim 1, wherein the electronic device further has a speaker coupled to the processor and the warning includes an audio notification played through the speaker.

4. The electronic device according to claim 1, wherein the electronic device further has a vibrator coupled to the processor and the warning includes a vibratory notification presented using the vibrator.

5. A method of password entry on an electronic device having a processor coupled to a front facing camera, a display, and a memory, the method comprising:
    activating the front facing camera to acquire an image when the electronic device is in a password entry mode to unlock the electronic device;
    processing the image to detect any faces in the image;
    when no faces are detected in the image, disabling the password entry mode; when one or more faces are detected in the image,
        processing the image to determine whether each face in the image is the face of an authorized user of the electronic device;
        when any face other than a face of an authorized user of the electronic device is detected in the image,
            presenting on the display a visual notification including a warning indicating observation of the display of the wireless device; and
            disabling the password entry mode.

6. The method according to claim 5, wherein the visual notification includes a color indication displayed on the display adjacent to a password entry area displayed on the display.

7. The method according to claim 5, wherein the electronic device further has a speaker coupled to the processor and presenting the warning includes playing an audio notification through the speaker.

8. The method according to claim 5, wherein the electronic device further has a vibrator coupled to the processor and presenting the warning includes activating the vibrator.

9. A non-transitory computer-readable medium storing program instructions that when executed by a processor of an electronic device having a front facing camera, a display, and a memory coupled to the processor, cause the electronic device to:
    activate the front facing camera to acquire an image when the electronic device is in a password entry mode to unlock the electronic device;
    process the image to detect any faces in the image;
    when no faces are detected in the image, disable the password entry mode;
    when one or more faces are detected in the image,
        process the image to determine whether each face in the image is the face of an authorized user of the electronic device;
        when any face other than a face of an authorized user of the electronic device is detected in the image,
            present on the display a visual notification including a warning indicating observation of the display of the wireless device; and
            disable the password entry mode.

10. The electronic device according to claim 1, wherein the visual notification includes a pop-up window having a message displayed on the display.

11. The electronic device according to claim 1, wherein the security module further configures the processor to:
    when no faces are detected in the image, present on the display a visual notification including a warning indicating no faces are detected.

12. The method according to claim 5, wherein the visual notification includes a pop-up window having a message displayed on the display.

13. The method according to claim 5, further comprising:
    when no faces are detected in the image, presenting on the display a visual notification including a warning indicating no faces are detected.

14. The non-transitory computer-readable medium of claim 9, wherein the visual notification includes a pop-up window having a message displayed on the display.

15. The non-transitory computer-readable medium of claim 9, wherein the program instructions when executed by the processor further cause the electronic device to:
   when no faces are detected in the image, present on the display a visual notification including a warning indicating no faces are detected.

\* \* \* \* \*